United States Patent
Tomikawa et al.

(10) Patent No.: US 9,109,185 B2
(45) Date of Patent: *Aug. 18, 2015

(54) SLIDING MEMBER AND SLIDING MATERIAL COMPOSITION

(71) Applicant: TAIHO KOGYO CO., LTD., Toyota-shi, Aichi (JP)

(72) Inventors: Takashi Tomikawa, Toyota (JP); Toshiyuki Chitose, Toyota (JP)

(73) Assignee: TAIHO KOGYO CO., LTD., Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/346,122

(22) PCT Filed: Sep. 28, 2012

(86) PCT No.: PCT/JP2012/075183
§ 371 (c)(1),
(2) Date: Mar. 20, 2014

(87) PCT Pub. No.: WO2013/047800
PCT Pub. Date: Apr. 4, 2013

(65) Prior Publication Data
US 2014/0303050 A1    Oct. 9, 2014

(30) Foreign Application Priority Data
Sep. 28, 2011  (JP) .................. 2011-213060

(51) Int. Cl.
*F16C 33/04* (2006.01)
*F16C 33/20* (2006.01)
(Continued)

(52) U.S. Cl.
CPC ......... *C10M 169/044* (2013.01); *C10M 103/06* (2013.01); *C10M 169/04* (2013.01);
(Continued)

(58) Field of Classification Search
CPC .................... C10M 2201/066; C10N 2240/02
USPC .................................. 508/108, 168
See application file for complete search history.

(56) References Cited

U.S. PATENT DOCUMENTS

| 5,525,246 A | 6/1996 | Kamiya et al. |
| 2007/0021544 A1* | 1/2007 | Yanase et al. ................. 524/423 |

(Continued)

FOREIGN PATENT DOCUMENTS

| EP | 2 757 277 A1 | 7/2014 |
| JP | 4-83914 A | 3/1992 |

(Continued)

OTHER PUBLICATIONS

International Search Report, dated for Dec. 25, 2012, issued by the International Searching Authority in counterpart International Application No. PCT/JP2012/075183.

(Continued)

*Primary Examiner* — Vishal Vasisth
(74) *Attorney, Agent, or Firm* — Sughrue Mion, PLLC

(57) ABSTRACT

An object of the present invention is to provide a sliding member capable of rapidly wrapping a mating member, and reducing the surface roughness of the mating member after wrapping. The present invention relates to a sliding member for sliding with a mating member subjected to hardening treatment, the sliding member including a coating layer containing a binder resin, molybdenum disulfide, and hard substance particles in massive form.

4 Claims, 1 Drawing Sheet

(51) Int. Cl.
  *C10M 169/06* (2006.01)
  *C10M 169/04* (2006.01)
  *C10M 103/06* (2006.01)
  *F16C 33/12* (2006.01)
  *C10M 149/18* (2006.01)
  *C10M 125/10* (2006.01)
  *C10M 125/26* (2006.01)

(52) U.S. Cl.
  CPC ............. *F16C33/121* (2013.01); *F16C 33/203* (2013.01); *C10M 125/10* (2013.01); *C10M 125/26* (2013.01); *C10M 149/18* (2013.01); *C10M 2201/062* (2013.01); *C10M 2201/0663* (2013.01); *C10M 2217/044* (2013.01); *F16C 2208/02* (2013.01); *F16C 2240/54* (2013.01)

(56) References Cited

U.S. PATENT DOCUMENTS

2010/0142872 A1* 6/2010 Egami et al. ................... 384/462
2010/0261625 A1* 10/2010 Hakamata ..................... 508/103

FOREIGN PATENT DOCUMENTS

| | | | |
|---|---|---|---|
| JP | 10-37962 | A | 2/1998 |
| JP | 11-106775 | A | 4/1999 |
| JP | 2002-53883 | A | 2/2002 |
| JP | 2002-88484 | A | 3/2002 |
| JP | 4004631 | B2 | 11/2007 |
| KR | 1019950033512 | | 6/2002 |
| KR | 1020020096921 | A | 12/2002 |
| WO | 92/01872 | A1 | 2/1992 |

OTHER PUBLICATIONS

Written Opinion, dated Dec. 25, 2013, issued by the International Searching Authority in counterpart International Application No. PCT/JP2012/075183.

Communication issued Jan. 19, 2015 by Korean Intellectual Property Office in related application No. 1020147006367.

Supplementary Extended European Search Report in the corresponding European Patent No. 12834823.2, dated Jun. 18, 2015.

* cited by examiner

SLIDING MEMBER AND SLIDING MATERIAL COMPOSITION

This application is a 371 of PCT/JP2012/075183, filed Sep. 28, 2012.

TECHNICAL FIELD

The present invention relates to a sliding member and a sliding material composition suitable to a mating member subjected to hardening treatment.

BACKGROUND ART

Conventionally, in order to supply lubrication to sliding sections of machinery, a surface of each sliding member is coated with a sliding material composition which is to be functioning as a lubricating film in each sliding section. Hence, it is required that the sliding material composition of this kind should be a lubricating film having low friction characteristic, excellent wear resistance so as not to wear out even after a long period of use, and good in fitness with a mating member.

A sliding material composition containing hard powder, a solid lubricant, and a resin binder is known as the conventional sliding material composition (see Patent Documents 1 to 3).

CITATION LIST

Patent Literature

Patent Document 1: Japanese Patent No.4004631
Patent Document 2: JP-A-H10-37962
Patent Document 3: JP-A-2002-53883

DISCLOSURE OF THE INVENTION

Problems to be Solved by the Invention

Hard powder contained in a sliding material composition is expected to have a so-called wrapping effect which can smooth the surface of a mating member by wrapping a roughened portion of the mating member. However, the wrapping effects provided by the above-described techniques are not enough. For example, while acute-angled particle as described in Patent Document 1 can be expected to have a rapid wrapping effect, however, since the wrapping effect occurs also after the transition into a smooth surface, the wearing away of the mating member continues to proceed, which turns out to increase the surface roughness of the mating member even after the wrapping. In addition, while the surface roughness of a mating material after wrapping is sufficient when using spherical particles as described in Patent Document 2, there is a problem in that the wrapping speed is slow.

An object of the present invention is to provide a sliding member capable of rapidly wrapping a mating member, and reducing the surface roughness of the mating member after wrapping.

Means for Solving the Problem

The present invention relates to a sliding member and a sliding material composition described hereinafter.

[1] A sliding member for sliding with a mating member subjected to hardening treatment, the sliding member comprising: a coating layer comprising a binder resin, molybdenum disulfide, and hard substance particles in massive form.

[2] The sliding member according to the above-described [1], wherein the hard substance particles have an average particle diameter that is 2 to 10 times as large as an arithmetic average roughness Ra of a sliding surface of the mating member.

[3] The sliding member according to the above-described [1] or [2], wherein the hard substance particles have a hardness equal to or larger than 1 time as large as a hardness of the mating member.

[4] A sliding material composition for use in a sliding member for sliding with a mating member subjected to hardening treatment, the sliding material composition comprising: a binder resin; molybdenum disulfide; and hard substance particles in massive form.

Advantageous Effects of Invention

According to the present invention, the sliding material composition and the sliding member show an excellent wear resistance and a seize resistance, which are provided by rapid and stable wrapping at a roughened portion of the mating member subjected to hardening treatment by sliding thereon.

BEST MODE FOR CARRYING OUT THE INVENTION

Figure 1:
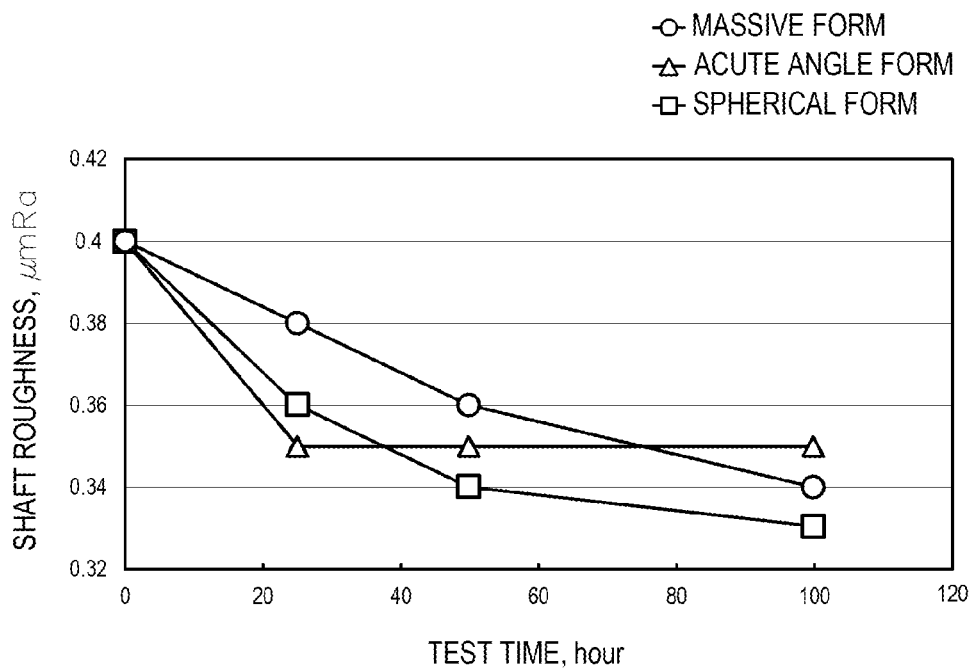
FIG. 1 is a graph showing relations between forms of hard substance particles and surface roughness of mating shafts after wear tests.

A sliding material composition according to the present invention (hereinafter, also referred to as the "composition according to the present invention") contains a binder resin, molybdenum disulfide, and hard substance particles in massive form.

The binder resin defines a material that binds the composition according to the present invention, and is preferably at least one kind of resin selected from the group consisting of a polyamide-imide (PAI) resin, a polyimide resin, a phenolic resin, a polyacetal resin, a polyether ether ketone resin, and a polyphenylene sulfide resin. Among these resins, the polyamide-imide (PAI) resin is preferably used from the viewpoint of wear resistance.

The composition according to the present invention contains the hard substance particles in massive form. In the present invention, an effect to smooth a sliding surface of a mating member, as it is called a wrapping effect, is imparted by the hard substance particles that are contained in the sliding material composition, whereby wear resistance and seizure resistance are improved. In the present invention, the hard substance particles are characterized by being in massive form. Here, the "massive form" means an irregular form that does not substantially contain projections equal to or smaller than 90°, and excludes forms such as spherical and acute angle forms that can be formed by processing. As being a massive form, unlike hard substance particles in acute angle form by which the wearing away of the mating member continues to proceed also after wrapping, or hard substance particles in spherical form that are too slow in wrapping to make a rapid transition into a smooth surface to be difficult, the hard substance particles in massive form exert a rapid wrapping effect and a stable wrapping effect even after a transition into a smooth surface.

It is necessary to adjust the particle diameter of the hard substance particles in accordance with the surface (sliding surface) roughness of the mating member in order to further exert the wrapping effect. Here, if a hard substance that is rough with respect to the surface roughness is added, the hard substance adversely attacks the mating member. On the other hand, if a hard substance that is too small is added, a wrapping effect cannot be obtained. Therefore, an average particle diameter (mode diameter) of the hard substance particles may be preferably 2 to 10 times, and particularly preferably 2 to 5 times as large as an arithmetic average roughness (Ra) of the sliding surface of the mating member.

It is to be noted that when the surface roughness is specified by a ten-point average roughness (Rz), the following relational expression is to be followed.

Arithmetic average roughness (Ra)=½ to ⅕×ten-point average roughness (Rz)

The hardness of the hard substance particles is not limited as long as the hard substance particles have sufficient hardness against the mating member which is subjected to hardening treatment. The hard substance particles preferably need to have sufficient hardness against the mating member such as a forged shaft and a cast shaft subjected to quenching treatment or nitriding treatment as hardening treatment. The hardness of the mating member is HV500 to 800 when subjected to quenching treatment, and HV1000 to 1100 in a compound layer and about HV800 in a diffusion layer when subjected to nitriding treatment, so that it is preferable that the hard substance particles have a hardness equal to or larger than 1 time in comparison with the hardness of the mating member. It is to be noted that the hardness defines Vickers hardness (the same shall apply hereinafter).

The type of the hard substance particles is not particularly limited. However, from the viewpoint of satisfying the above hardness, $Fe_3P$ (about HV800), $Al_2O_3$ (HV1500 or more), SiC (HV2000 or more), AlN (HV1000 or more) and the like can be preferably used, and $Al_2O_3$ and SiC are particularly preferably used.

In addition, the content of the hard substance particles in the composition according to the present invention is preferably 0.1 to 5% by volume, and particularly preferably 1 to 4% by volume. When the content is whithin the above range, the composition has a wrapping effect with deterioraiton of the mating member being made low.

The molybdenum disulfide (MoS2) functions as a solid lubricant to impart wear resistance in the composition according to the present invention. While a variety of materials such as polytetrafluoroethylene (PTFE) and graphite are known as a solid lubricant in addition to the molybdenum disulfide, the molybdenum disulfide shows the most excellent lubricating effect among others. For example, because the PTFE is oleophobic, an oil film is hard to be formed in sliding under oil lubrication, which could reduce seize resistance. In contrast to this, the molybdenum disulfide can exert an excellent lubricating effect regardless of a lubrication condition. In addition, while the graphite has both the function as a solid lubricant and the function as hard substance particles though depending on the crystallinity, the effect as the lubricant is lower than that of the molybdenum disulfide, and the wrapping effect as the hard substance particles is lower than that of the above-described hard substance particles in massive form. However, it is to be noted that using the graphite in combination with the molybdenum disulfide and the hard substance particles in massive form is preferable because the lubricating effect and the wrapping effect can be further improved.

The content of molybdenum disulfide in the composition according to the present invention is 25 to 70% by volume, and preferably 35 to 60% by volume. When the molybdenum disulfide content is whithin the above range, a sufficient lubricating effect can be obtained.

It is to be noted that that the molybdenum disulfide preferably has an average particle diameter equal to or less than 5 µm, and particularly preferably equal to or less than 3 µm.

The composition according to the present invention may contain a solid lubricant other than the molybdenum disulfide.

The other solid lubricant is preferably at least one kind of solid lubricant selected from the group consisting of graphite, tungsten disulfide, mica, boron nitride, graphite fluoride, and fullerene. These solid lubricants are auxiliaries to the molybdenum disulfide, and are for obtaining a lubricating effect also when oil runs out, so that the content of these solid lubricants is preferably 5 to 35% by volume.

The composition according to the present invention may further contain an inorganic additive, and the inorganic additive is preferably at least one kind of inorganic additive selected from the group consisting of calcium carbonate, barium sulfate, and calcium phosphate. In addition, from the viewpoint of wear resistance, the content of inorganic additive in the composition is preferably 5 to 10% by volume.

The sliding material composition according to the present invention can be used for a coating layer of a base member surface of a sliding member. The sliding material composition according to the present invention is preferably used for coating on the sliding surface especially when a mating sliding member is subjected to hardening treatment such as quenching treatment or nitriding treatment. Specific examples of the mating member described above include a quenched shaft and a shaft subjected to nitriding treatment.

The sliding member according to the present invention includes a base member, and a coating layer provided on the base member, and the coating layer is formed from the above-described sliding material composition according to the present invention. The material for the base member of the sliding member according to the present invention is not particularly limited. However, it is preferable to select the material from the group consisting of steel, stainless steel, cast iron, copper, copper alloy, aluminum, aluminum alloy, rubber, plastics, and ceramics. In addition, the form of the base member is not particularly limited, and may be a plate shape or a tube shape. In addition, it is preferable that the base member includes a back steel such as steel and stainless steel, and an alloy layer disposed on the back steel and containing aluminum alloy, copper alloy or the like.

As a method for forming the coating layer, for example, a method for mixing the composition according to the present invention with a solvent of a binder resin, forming a film of the mixture on the base member surface using a known method such as air spray coating, and then firing the film at a firing temperature of the binder resin can be applied. In addition, the base member surface may be subjected to surface roughening treatment before the surface is coated, or an adhesion layer may be provided between the base member and the coating layer in order to strengthen the coating. The thickness of the coating layer is preferably 5 to 30 µm. The surface roughness of the coating layer is not particularly limited, but is preferably 0.3 to 3 µmRa.

The lubrication condition of the sliding member according to the present invention is not particularly limited, and any condition of oil lubrication, grease lubrication and no lubrication can be used.

EXAMPLES

Aluminum bimetallic base members (about 1.5 mm in thickness (0.2 mm in thickness in aluminum alloy layers)) were subjected to shot blasting treatment, and then the compositions shown in Table 1 were spray coated so as to have a thickness of 10 μm, and coating layers were formed. After the forming of the films by the spray coating, the members were fired at 200° C., and thus samples were produced. The used materials are as follows.

Binder Resin
  Polyamide-imide (PAI) resin: manufactured by HITACHI CHEMICAL CO., LTD.
Solid Lubricant
  Molybdenum disulfide: manufactured by SUMICO LUBRICANT CO., LTD., average particle diameter of 2 μm
  Graphite: manufactured by SUMICO LUBRICANT CO., LTD., average particle diameter of 2 μm
  Tungsten disulfide: manufactured by SUMICO LUBRICANT CO LTD., average particle diameter of 2 μm
Hard Substance Particles
  $Al_2O_3$:
    Massive form, acute angle form . . . manufactured by FUJIMI INCORPORATED CO LTD.
    Spherical form . . . manufactured by ADMATECHS COMPANY LIMITED
  SiC:
    All types . . . manufactured by FUJIMI INCORPORATED CO LTD.
  $Fe_3P$:
    All types . . . manufactured by FUKUDA METAL FOIL & POWDER CO., LTD.

The samples (bearings) of the Examples and the Comparative Examples were subjected to wear tests by using forged shafts having been subjected to quenching treatment (a hardness of HV600 to 800) as mating members, and the surface roughness of sliding surfaces of the mating shafts before and after the tests, and the wear depth of sliding surfaces of the samples were measured. The results are shown in Table 1.

Figure 2:
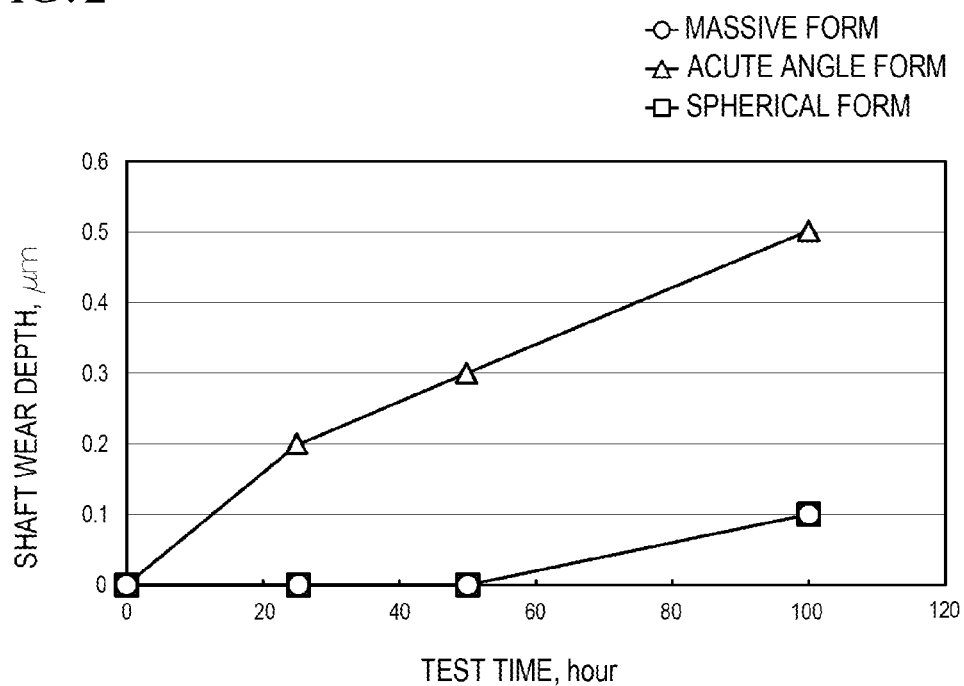
FIG. 2 is a graph showing the relations between the forms of hard substance particles and the wear depth of mating shafts after wear tests.

In addition, with respect to Examples 4 to 6, Comparative Examples 1 to 3, and Comparative Examples 6 to 8, the relations between the forms of the hard substance particles and the surface roughness of the mating shafts after the tests are shown in FIG. 1, and the relations between the forms of the hard substance particles and the wear depth of the mating shafts after the tests are shown in FIG. 2.

(Wear Test)
The wear tests were performed using a partial contact wear tester under the following conditions.
  The number of revolutions: Cycle test of 0 rpm (1 minute holding)→1200 rpm (1 minute holding)→0 rpm (1 minute holding)
  Lubricating oil: 0W-20
  Lubricating temperature: 100° C.
  Load: 4.41 kN
  Test time: 100 hours
(Surface Roughness Measurement)
Arithmetic average roughness (Ra) was measured in accordance with the JIS B 061 (2001).
(Wear Depth Measurement)
The thickness of the coating layers of the samples (bearings) was measured before and after the tests, and the wear depth was calculated from those values.

TABLE 1

| | | $MoS_2$ additive amount (% by volume) | Solid lubricant Type | Additive amount (% by volume) | Hard substance particles Form | Type | Additive amount (% by volume) | Average particle diameter (μm) | Test time (h) | Shaft roughness before test (μmRa) | particles/ shaft roughness before test (times) | Shaft roughness after test (μmRa) | Shaft wear after test μm |
|---|---|---|---|---|---|---|---|---|---|---|---|---|---|
| Examples | 1 | 30 | — | — | Massive form | SiC | 1 | 0.5 | 25 | 0.1 | 5 | 0.08 | 0 |
| | 2 | 30 | — | — | Massive form | SiC | 1 | 0.5 | 50 | 0.1 | 5 | 0.07 | 0 |
| | 3 | 30 | — | — | Massive form | SiC | 1 | 0.5 | 100 | 0.1 | 5 | 0.07 | 0 |
| | 4 | 50 | — | — | Massive form | $Al_2O_3$ | 3 | 1 | 25 | 0.4 | 2.5 | 0.36 | 0 |
| | 5 | 50 | — | — | Massive form | $Al_2O_3$ | 3 | 1 | 50 | 0.4 | 2.5 | 0.34 | 0 |
| | 6 | 50 | — | — | Massive form | $Al_2O_3$ | 3 | 1 | 100 | 0.4 | 2.5 | 0.33 | 0.1 |
| | 7 | 70 | — | — | Massive form | Fe3P | 5 | 4 | 25 | 1 | 4 | 0.9 | 0 |
| | 8 | 70 | — | — | Massive form | $Fe_3P$ | 5 | 4 | 50 | 1 | 4 | 0.86 | 0.1 |
| | 9 | 70 | — | — | Massive form | $Fe_3P$ | 5 | 4 | 100 | 1 | 4 | 0.82 | 0.2 |
| | 10 | 30 | PTFE | 20 | Massive form | $Al_2O_3$ | 3 | 0.05 | 100 | 0.1 | 0.5 | 0.07 | 0 |
| | 11 | 30 | PTFE | 20 | Massive form | $Al_2O_3$ | 3 | 1 | 100 | 0.1 | 10 | 0.07 | 0.1 |
| | 12 | 30 | Gr | 30 | Massive form | $Fe_3P$ | 4 | 0.2 | 100 | 0.4 | 0.5 | 0.34 | 0.1 |
| | 13 | 30 | Gr | 30 | Massive form | $Fe_3P$ | 4 | 4 | 100 | 0.4 | 10 | 0.33 | 0.1 |
| | 14 | 25 | $WS_2$ | 15 | Massive form | SiC | 2 | 0.5 | 100 | 1 | 0.5 | 0.81 | 0.2 |
| | 15 | 25 | $WS_2$ | 15 | Massive form | SiC | 2 | 10 | 100 | 1 | 10 | 0.83 | 0.2 |
| Comparative Examples | 1 | 50 | — | — | Acute angle form | $Al_2O_3$ | 3 | 1 | 25 | 0.4 | 2.5 | 0.35 | 0.2 |
| | 2 | 50 | — | — | Acute angle form | $Al_2O_3$ | 3 | 1 | 50 | 0.4 | 2.5 | 0.35 | 0.3 |
| | 3 | 50 | — | — | Acute angle form | AisOa | 3 | 1 | 100 | 0.4 | 2.5 | 0.35 | 0.5 |
| | 4 | — | PTFE | 40 | Massive form | SiC | 2 | 4 | 100 | 0.4 | 10 | 0.5 | 0.8 |
| | 5 | 5 | PTFE | 50 | Massive form | $Al_2O_3$ | 2 | 2 | 100 | 0.4 | 5 | 0.4 | 0.2 |
| | 6 | 50 | — | — | Spherical form | $Al_2O_3$ | 3 | 1 | 25 | 0.4 | 2.5 | 0.38 | 0 |
| | 7 | 50 | — | — | Spherical form | $Al_2O_3$ | 3 | 1 | 50 | 0.4 | 2.5 | 0.36 | 0 |
| | 8 | 50 | — | — | Spherical form | $Al_2O_3$ | 3 | 1 | 100 | 0.4 | 2.5 | 0.34 | 0.1 |

It is evident from FIG. 1 that, with respect to the hard substance particles in spherical form, it takes time to reduce the shaft roughness, and with respect to the hard substance particles in acute angle form, the proportion of the shaft roughness reduction is low.

It is evident from FIG. 2 that, with respect to the hard substance particles in acute angle form, the influence of continuously chipping the shaft is larger.

The present invention has been described in detail with reference to the specific embodiment. However, it will be obvious to those skilled in the art that various changes and modifications may be made without departing from the spirit and scope of the present invention. The present application is based on the Japanese Patent Application filed on Sep. 28, 2011 (P2011-213060), and the contents thereof are incorporated herein by reference.

The invention claimed is:

1. A sliding member for sliding with a mating member subjected to hardening treatment, the sliding member comprising:
  a coating layer comprising a binder resin, molybdenum disulfide, and hard substance particles in massive form, said massive form being an irregular form that does not substantially contain projections equal to or smaller than 90°, and excluding spherical and acute angle forms that can be formed by processing.

2. The sliding member according to claim 1, wherein the hard substance particles have an average particle diameter that is 2 to 10 times as large as an arithmetic average roughness Ra of a sliding surface of the mating member.

3. The sliding member according to claim 1, wherein the hard substance particles have a hardness equal to or larger than 1 time as large as a hardness of the mating member.

4. A sliding material composition for use in a sliding member for sliding with a mating member subjected to hardening treatment, the sliding material composition comprising:
  a binder resin;
  molybdenum disulfide; and
  hard substance particles in massive form, said massive form being an irregular form that does not substantially contain projections equal to or smaller than 90°, and excluding spherical and acute angle forms that can be formed by processing.

* * * * *